Feb. 11, 1936. L. NAVIAS 2,030,390
GLASS
Filed Aug. 11, 1934

Inventor:
Louis Navias,
by Harry E. Dunham
His Attorney.

Patented Feb. 11, 1936

2,030,390

UNITED STATES PATENT OFFICE 2,030,390

GLASS

Louis Navias, Schenectady, N. Y., assignor to General Electric Company, a corporation of New York Application August 11, 1934, Serial No. 739,455

2 Claims. (Cl. 176—122)

The present invention relates to the glass art and its object is to produce a glass which is resistant chemically and physically to the decomposing and disintegrating effect of highly heated metallic vapors. In particular it is the object of my invention to provide a glass suitable for use as a protective coating or glaze upon the interior surface of sodium lamp bulbs, where the glaze is exposed to highly heated and therefore chemically active sodium vapor.

It has been proposed heretofore to coat glass containers which are not inert to hot alkali vapor with a borate which is substantially devoid of silica. Such borates are not resistant to moisture and weathering influence and tend to deteriorate before the bulb is sealed during the course of manufacture. Glasses containing silica in addition to boric oxide, and commonly termed borosilicates, have been found better suited for this purpose. In accordance with my present invention I have provided new and improved borosilicate glasses which are moisture-resistant while also being more inert chemically to hot sodium vapor and also are more transparent than the borosilicate glasses which have heretofore been employed.

In glasses embodying my invention the content of boric anhydride ($B_2O_3$) within the limits of about 20 to 50% and the content of silica ($SiO_2$) less than about 20% and preferably within the limits of about ½ to 15% make up the base-forming constituents which include barium oxide within the limits of about 25 to 50%.

Figure 1:
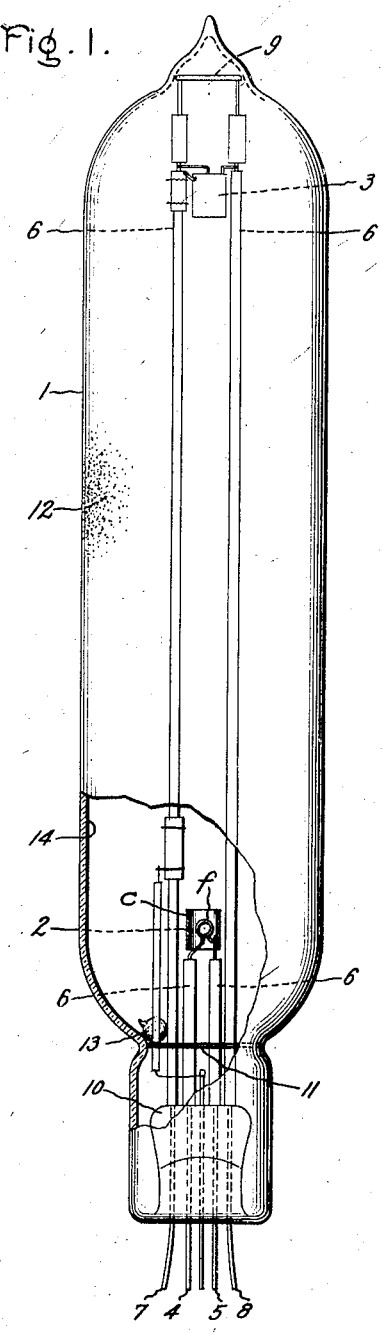
Figure 2:
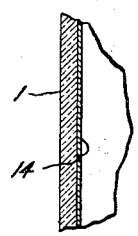

The accompanying drawing shows in Fig. 1 a vapor lamp embodying my invention and in Fig. 2 is shown an enlarged detail view of a section of a portion of the glass wall. As illustrative of my invention is a glass containing the following constituents:

Example 1

| | Parts |
|---|---|
| Sodium oxide ($Na_2O$) | 11 |
| Aluminum oxide ($Al_2O_3$) | 10 |
| Barium oxide (BaO) | 31 |
| Boron oxide ($B_2O_3$) | 40 |
| Silica ($SiO_2$) | 8 |

This glass is particularly suitable for use as a thin, protective coating or glaze applied on the interior bulbs of lime glass, which has a thermal coefficient of linear expansion of about 9 to $10 \times 10^{-6}$ and which is not immune to alkali vapor. The proportion of the constituents of glasses made in accordance with my invention may be varied within the limits above indicated providing a proper relation is maintained between the basic and acid constituents to produce a glass having a desired coefficient of expansion and other desired physical characteristics.

For example, a glass also suitable for use as a protective glaze upon the interior of lime glass bulbs may have the following analysis:

Example 2

| | Parts |
|---|---|
| Sodium oxide ($Na_2O$) | 11 |
| Aluminum oxide ($Al_2O_3$) | 11 |
| Barium oxide (BaO) | 33 |
| Boron oxide ($B_2O_3$) | 42 |
| Silica ($SiO_2$) | 3 |

The lamp shown in Fig. 1 comprises an elongated glass container 1 at the opposite ends of which are located electrodes 2, 3, between which an arc discharge operates through the gaseous contents of the container. This lamp is of the type shown in copending application Serial No. 642,882, filed November 16, 1932, by Andrew H. Young (see corresponding British Patent 405,232). The particular electrodes here shown consist of a coiled filamentary member $f$, which ordinarily consists of nickel coated with barium oxide, or other thermionically active material, and a surrounding cylindrical member $c$ which also may consist of nickel (see electrode 2) and which is connected to the member $f$. The filamentary member $f$ is supplied with heating current by the leading-in conductors 4, 5, which are sealed into the glass envelope as usual and are surrounded by protective sleeves 6 of refractory material. The electrode 3 is similarly connected to conductors 7, 8 (also surrounded by a refractory sleeve) which are kept from unduly vibrating by an anchor 9 engaging with the glass container. The sealing region of the envelope adjacent the stem 10 is shut off from the vapor space by a partition 11. The container first is evacuated during fabrication of the lamp, then is charged with luminosity-producing vapor, such as sodium for example, as indicated at 12. Other vaporizable materials such as potassium, cadmium, zinc, and the like, may be used in such lamps. The sodium, or the like, may be introduced from a small glass capsule 13 which is broken when the material therein is to be released. A gas, such as neon, or argon, also may be present, usually at a pressure of two or three millimeters of mercury.

As shown in Fig. 2, the inner surface of the glass envelope 1 is lined with a glass or glaze 14 which is resistant to the disintegrating effect of the alkali vapor, or whatever gaseous filling may be employed. The thickness of the glaze may be even less than shown in Fig. 2.

The preparation of a glass having an analysis within the limits indicated above is within the knowledge of the ordinary glass maker. However, for the purpose of illustration there is given below the composition of a batch of raw glass-forming materials which would yield by fusion (preferably in a platinum crucible) a glass having a composition within the limits characteristic of my invention. A batch yielding a glass having analysis corresponding to Example 1 may consist of the following ingredients:

| | Parts |
|---|---|
| Sodium carbonate (hydrated) | 14.0 |
| Sodium nitrate | 11.0 |
| Aluminum oxide | 10.0 |
| Barium carbonate | 39.9 |
| Boric acid | 71.1 |
| Quartz or other form of silica | 8.0 |

When the fusion is complete the platinum crucible may be quickly cooled to cause separation of the contents from the chilled walls of the crucible. The glass thus produced is crushed and ground while being kept free from moisture. The powdered product preferably is stored until desired for use in a space maintained at a temperature above 100° C. It may be applied to the inner surface of a lamp bulb such as shown in the drawing while suspended in an organic liquid which is evaporated after the film has been applied. The residual film of powdered material is fused by heating the bulb until a substantially clear coating results.

What I claim as new and desire to secure by Letters Patent of the United States, is:

1. In combination with an electrical discharge device which contains a quantity of chemically active material and comprising a container which is susceptible to chemical attack by said material, a lining for said container comprising a barium-containing borosilicate glass, the barium oxide content of which is within the limits of about 25 to 50 per cent, the boric anhydride of which is within the limits of 50 to 20 per cent, and the silica content of which is less than about 20 per cent.

2. In combination with an electrical discharge device which contains a quantity of chemically active material and comprising a container which is susceptible to chemical attack by said material, a lining for said container comprising a barium-containing borosilicate glass, containing the following ingredients in the proportions indicated:

| | Parts |
|---|---|
| Sodium oxide ($Na_2O$) | 11 |
| Aluminum oxide ($Al_2O_3$) | 10 |
| Barium oxide (BaO) | 31 |
| Boron oxide ($B_2O_3$) | 40 |
| Silica ($SiO_2$) | 8 |

LOUIS NAVIAS.